United States Patent
Thornton et al.

(10) Patent No.: US 12,175,672 B2
(45) Date of Patent: Dec. 24, 2024

(54) MULTI-CHAMBER LIGHTING CONTROLLER FOR AQUACULTURE

(71) Applicant: TidalX AI Inc., San Ramon, CA (US)

(72) Inventors: Christopher Thornton, Mountain View, CA (US); Matthew Messana, Sunnyvale, CA (US); James Daniel Haley, Oakland, CA (US); Shane Washburn, Oakland, CA (US)

(73) Assignee: TidalX AI Inc., San Ramon, CA (US)

( * ) Notice: Subject to any disclaimer, the term of this patent is extended or adjusted under 35 U.S.C. 154(b) by 0 days.

(21) Appl. No.: 18/298,294

(22) Filed: Apr. 10, 2023

(65) Prior Publication Data

US 2023/0316516 A1     Oct. 5, 2023

Related U.S. Application Data

(63) Continuation of application No. 16/845,189, filed on Apr. 10, 2020, now Pat. No. 11,657,498.

(51) Int. Cl.
   *G06K 9/00*     (2022.01)
   *A01K 61/13*    (2017.01)
   (Continued)

(52) U.S. Cl.
   CPC ............ *G06T 7/0012* (2013.01); *A01K 61/13* (2017.01); *A01K 63/003* (2013.01); *A01K 63/06* (2013.01);
   (Continued)

(58) Field of Classification Search
   None
   See application file for complete search history.

(56) References Cited

U.S. PATENT DOCUMENTS

| 7,853,046 B2 | 12/2010 | Sharony |
| 8,456,956 B2 | 6/2013 | Wang et al. |

(Continued)

FOREIGN PATENT DOCUMENTS

| CL | 2019000039 A1 | 3/2019 |
| CN | 108040948 | 5/2018 |

(Continued)

OTHER PUBLICATIONS

Extended Search Report in European Appln. No. 22151132.2, dated May 2, 2022, 10 pages.

(Continued)

*Primary Examiner* — Wei Wen Yang
(74) *Attorney, Agent, or Firm* — Fish & Richardson P.C.

(57) ABSTRACT

Methods, systems, and apparatus, including computer programs encoded on computer-storage media, for a lighting controller for sea lice detection. In some implementations, fish are contained within an elliptical tank filled with water. An imaging station located on the elliptical tank is used to capture an image of a fish from which image analysis can be performed to detect sea lice or other skin features, including lesions, on the fish. Pairs of imaging assemblies coordinate pulsing light of at least a first and a second color and capturing images of the fish while the fish is illuminated by at least the first and the second color. By using the captured images with different color light, computers can detect features on the body of a fish including sea lice, skin lesions, shortened operculum or other physical deformities and skin features. Detection results can aid in mitigation techniques or be stored for analytics. For example, sea lice detection results can inform targeted treatments comprised of lasers, fluids, or mechanical devices such as a brush or suction.

16 Claims, 7 Drawing Sheets

(51) Int. Cl.
  *A01K 63/00* (2017.01)
  *A01K 63/06* (2006.01)
  *G06T 7/00* (2017.01)
  *H04N 23/60* (2023.01)
  *H05B 45/20* (2020.01)

(52) U.S. Cl.
  CPC .............. *H04N 23/60* (2023.01); *H05B 45/20* (2020.01); *G06T 2207/10028* (2013.01); *G06T 2207/20084* (2013.01)

(56) References Cited

U.S. PATENT DOCUMENTS

| | | |
|---|---|---|
| 10,856,520 B1 | 12/2020 | Kozachenok et al. |
| 10,863,727 B2 | 12/2020 | Jans |
| 11,657,498 B2 | 5/2023 | Thornton et al. |
| 2013/0273599 A1 | 10/2013 | Robitaille |
| 2015/0136037 A1 | 5/2015 | Boonekamp |
| 2017/0150701 A1 | 6/2017 | Gilmore et al. |
| 2018/0000055 A1 | 1/2018 | Tanase |
| 2018/0027637 A1 | 1/2018 | Kurt |
| 2019/0228218 A1 | 7/2019 | Barnaby et al. |
| 2019/0340440 A1 | 11/2019 | Atwater et al. |
| 2019/0363791 A1 | 11/2019 | Teo |
| 2020/0107524 A1 | 4/2020 | Messana et al. |
| 2020/0113158 A1 | 4/2020 | Rishi |
| 2020/0155882 A1 | 5/2020 | Tohidi et al. |
| 2020/0288678 A1 | 9/2020 | Howe et al. |
| 2020/0288679 A1 | 9/2020 | Howe |
| 2020/0288680 A1 | 9/2020 | Howe |
| 2021/0080715 A1 | 3/2021 | Saxena |
| 2021/0142052 A1 | 5/2021 | James |
| 2021/0319550 A1 | 10/2021 | Thornton et al. |

FOREIGN PATENT DOCUMENTS

| | | | | |
|---|---|---|---|---|
| CN | 207964805 | | 10/2018 | |
| CN | 110114782 | A * | 8/2019 | ............ A01K 61/95 |
| DE | 102017011816 | | 6/2019 | |
| EP | 2244934 | | 11/2010 | |
| EP | 2962556 | | 1/2016 | |
| EP | 3484283 | | 5/2019 | |
| GB | 2539495 | | 12/2016 | |
| JP | 2002171853 | | 6/2002 | |
| NO | 300401 | | 5/1997 | |
| NO | 20160199 | | 8/2017 | |
| RU | 2701947 | | 10/2019 | |
| WO | WO 1990/007874 | | 7/1990 | |
| WO | WO 1997/019587 | | 6/1997 | |
| WO | WO 2009/008733 | | 1/2009 | |
| WO | WO 2009/097057 | | 8/2009 | |
| WO | WO 2012/081990 | | 6/2012 | |
| WO | WO 2014/179482 | | 11/2014 | |
| WO | WO 2017/137896 | | 8/2017 | |
| WO | WO 2018/011744 | | 1/2018 | |
| WO | WO 2018/011745 | | 1/2018 | |
| WO | WO 2019/002881 | | 1/2019 | |
| WO | WO 2019/106856 | | 6/2019 | |
| WO | WO 2019/121851 | | 6/2019 | |
| WO | WO 2019/121900 | | 6/2019 | |
| WO | WO-2019121844 | A1 * | 6/2019 | ............ A01K 61/13 |
| WO | WO 2019/188506 | | 10/2019 | |
| WO | WO 2019/232247 | | 12/2019 | |
| WO | WO 2019/245722 | | 12/2019 | |
| WO | WO 2020/046524 | | 3/2020 | |
| WO | WO 2020/132031 | | 6/2020 | |
| WO | WO 2020/145336 | | 7/2020 | |
| WO | WO 2020/180188 | | 9/2020 | |
| WO | WO 2021/006744 | | 1/2021 | |
| WO | WO 2021/030237 | | 2/2021 | |
| WO | WO 2021/188292 | | 9/2021 | |
| WO | WO 2022/010815 | | 1/2022 | |
| WO | WO 2020/072438 | | 4/2022 | |

OTHER PUBLICATIONS

International Preliminary Report on Patentability in International Appln. No. PCT/US2020/059829, dated May 27, 2022, 11 pages.
Decision to Grant Patent in Japanese Appl. No. 2022-555752, dated Aug. 2, 2023, 5 pages (with English translation).
International Preliminary Report on Patentability in International Appln, No. PCT/US2021/023104, dated Oct. 20, 2022, 8 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
International Search Report and Written Opinion in International Appln. No. PCT/US2022/036772, dated Nov. 22, 2022, 15 pages.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition," Thesis for Master's degree in Artificial Intelligence, Norwegian University of Science and Technology, Jume 2019, 86 pages.
Moskvyak et al., "Robust Re-identification of Manta Rays from Natural Markings by Learning Pose Invariant Embeddings," CoRR, Feb. 2019, arXiv: 1902.10847v1, 12 pages.
Odey, "AquaMesh—Design and Implementation of Smart Wireless Mesh Sensor Networks for Aquaculture," American Journal of Networks and Communications, Jul. 2013, 8 pages.
Office Action in Japanese Appln. No. 2022-555752, dated May 8, 2023, 4 pages (with English translation).
PCT International Search Report and Written Opinion in International Appln. No. PCT/US2021/023104, dated Jun. 18, 2021, 13 pages.
Petrov et al., "Overview of the application of computer vision technology in fish farming," E3S Web of Conferences, 2020, 175:02015.
Qiu et al., "Improving Transfer Learning and Squeeze-and-Excitation Networks for Small-Scale Fine-Grained Fish Image Classification," IEEE Access, Dec. 2018, 6(31):78503-78512.
Saberloon et al., "Application of Machine Vision Systems in Aquaculture with Emphasis on Fish: State-of-the-Art and Key Issues," Reviews in Aquaculture, Dec. 2017, 9:369-387.
Stein et al., "Consistent melanophore spot patterns allow long-term individual recognition of Atlantic salmon Salmo Salar," Journal of Fish Biology, Nov. 2017, 91(6):1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.

* cited by examiner

MULTI-CHAMBER LIGHTING CONTROLLER FOR AQUACULTURE

CROSS-REFERENCE TO RELATED APPLICATIONS

This application claims priority to U.S. application Ser. No. 16/845,189, filed Apr. 10, 2020, the contents of which are incorporated herein by reference in their entirety.

TECHNICAL FIELD

This specification generally describes lighting controllers, particularly those used for aquaculture.

BACKGROUND

Researchers and fish farm operators face several challenges in observing and recording the behavior of fish. A manual process of observing a sample set of fish is often used to estimate fish characteristics. However, such a manual process is often time-consuming, expensive, and has several limitations, such as when adverse weather conditions decrease the availability of human observers.

SUMMARY

In general, innovative aspects of the subject matter described in this specification relate to the monitoring and imaging of fish, for example in the context of aquaculture.

According to one implementation of the subject matter described in this specification, fish are contained within an elliptical tank filled with water. A multi-chamber imaging station located on the elliptical tank illuminates and captures one or more images of a fish from one or more viewpoints including a top view, a side view, an alternate side view, and a bottom view. Image analysis can be performed on the one or more images to detect sea lice or other skin features, including lesions, physical deformities, or other features on the fish. Detection can be automatic and can inform various techniques of mitigation by the multi-chamber imaging station. For sea lice detection, mitigation can include processes for delousing.

In some implementations, the multi-chamber imaging station includes multiple sub-elements. For example, the multi-chamber imaging station can include a first and a second pair of imaging assemblies each equipped with a camera and a pair of lights and each with a view into a container that can hold at least one fish.

In some implementations, a fish is illuminated with light of a first color in each of a first pair of fish imaging assemblies. Cameras in each of a different, second pair of fish imaging assemblies are controlled to open for exposures while the fish is illuminated. A first image can be subsequently generated.

In some implementations, the fish is illuminated with light of the first color in each of the second pair of fish imaging assemblies. Cameras in each of the first pair of fish imaging assemblies are controlled to open for exposures while the fish is illuminated. A second image can be subsequently generated.

In some implementations, the fish is kept in a continuous fish tank. For example, a fish tank with straight and curved sections equipped with the fish imaging container and the four fish imaging assemblies.

In some implementations, the fish imaging container and the four fish imaging assemblies are deployed in open water. For example, the fish imaging container and the four fish imaging assemblies can be deployed in the ocean.

In some implementations, the fish is illuminated with light of a second color in each of the first pair of fish imaging assemblies. Cameras in each of the second pair of fish imaging assemblies are controlled to open for exposures while the fish is illuminated.

In some implementations, the fish is illuminated with light of a second color in each of the second pair of fish imaging assemblies. Cameras in each of the first pair of fish imaging assemblies are controlled to open for exposures while the fish is illuminated.

In some implementations, one or more images are analyzed to generate a determination. For example, one or more images can be analyzed to determine whether or not the fish is likely affected by a particular condition (e.g., sea lice, skin lesions, shortened operculum, other physical deformities, skin features, etc.). In some cases, an analysis can be performed on at least the first image.

In some implementations, elements of determining whether the particular fish is likely affected by a particular condition are informed by machine learning. For example, a trained machine learning object detection algorithm can be used to detect sea lice on the body of a fish within a captured image of the fish.

In some implementations, the pair of lights within the system alternate between the first color and the second color quickly enough to reduce the appearance of flickering as perceived by the eye of a fish or human. For example, the pair of lights can alternate at a rate greater than 60 Hz.

In some implementations, elements of illuminating a light or controlling an exposure of a camera within either the first pair of imaging assemblies or the second pair of imaging assemblies or generating an image of the particular fish are informed by machine learning. For example, a machine learning model can be trained to control the exposure of a camera together with the illumination of one or more lights to improve the quality of one or more generated images.

In some implementations, an image buffer is used to store one or more images generated from a camera in either the first pair of fish imaging assemblies or the second pair of fish imaging assemblies. For example, data from one or more exposures of a camera can be stored within an image buffer before being offloaded to another computing device.

According to another implementation of the subject matter described by this specification, a fish imaging system includes a fish imaging container that includes multiple sides around the fish imaging container that each include a window for viewing fish that swim through the fish imaging container, and one or more fish imaging assemblies that are each associated with a different side of the fish imaging container. Each fish imaging assembly includes a camera for viewing, through a window of the fish imaging container, fish that swim through the fish imaging container, and a pair of lights including a light of a first color and a light of a second color, each for illuminating, through the window of the fish imaging container, fish that swim through the fish imaging container.

According to another implementation of the subject matter described by this specification, a process includes illuminating a light of a first color in each of a first pair of fish imaging assemblies that are on opposite sides of a fish imaging container, controlling an exposure of a camera in each of a different, second pair of fish imaging assemblies that are on opposite sides of the fish imaging container to generate a first image of a particular fish swimming through the fish imaging container, while the light of the first color is illuminated in each of the first pair of fish imaging assemblies, illuminating a light of the first color in each of the second pair of fish imaging assemblies, and controlling the exposure of a camera in each of the first pair of fish imaging assemblies, while the first color is illuminated in each of the second pair of fish imaging assemblies.

According to another implementation of the subject matter described by this specification, a fish imaging container includes four sides around the fish imaging container that each include a window for viewing fish that swim through the fish imaging container, and one or more imaging assemblies that are each associated with a different side of the fish imaging container.

According to another implementation of the subject matter described by this specification, a fish imaging assembly includes a camera for viewing, through a window of a fish imaging container, fish that swim through the fish imaging container, and a pair of lights including a light of a first color and a light of a second color, each for illuminating, through the window of the fish imaging container, fish that swim through the fish imaging container.

According to another implementation of the subject matter described by this specification, a process includes illuminating, by a fish imaging system that includes (i) a fish imaging container that includes multiple sides around the fish imaging container that each include a window for viewing fish that swim through the fish imaging container, and (ii) multiple fish imaging assemblies that are each associated with a different side of the fish imaging container, and that each include (a) a camera for viewing, through a window of the fish imaging container, fish that swim through the fish imaging container, and (b) a pair of lights including a light of a first color and a light of a second color, each for illuminating, through the window of the fish imaging container, fish that swim through the fish imaging container, a light of the first color in each of a first pair of fish imaging assemblies that are on opposite sides of the fish imaging container.

Advantageous implementations can include one or more of the following features. For example, storing the fish in an elliptical or racetrack-like tank allows fish to swim naturally in a given direction. Straight sections of the tank help simulate natural, straight line swimming, which is preferred by some fish species, while curved sections help maintain effective containment by creating a continuous circuit. The tank simplifies the imaging process by guiding fish into a particular area, e.g. a given section of the tank as fish swim around the tank. Imaging and mitigation components, such as the multi-chamber imaging station, can then be focused on the particular area enabling several benefits including improved detection, effective mitigation, and greater visual coverage of a given fish.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
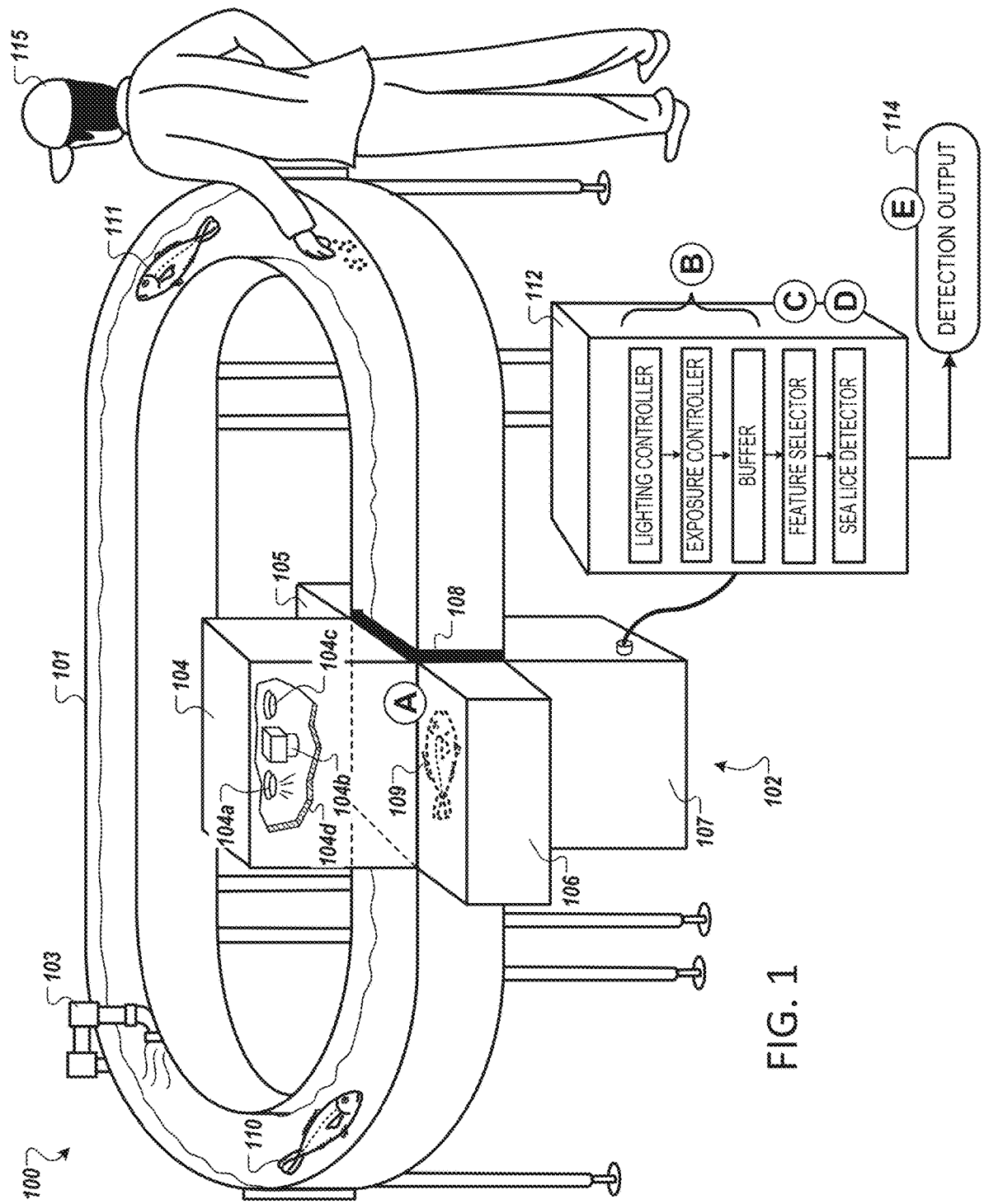
FIG. 1 is a diagram showing an example of a multi-chamber lighting controller system.

FIG. 1 is a diagram showing an example of a lighting controller system 100. The system 100 includes a fish tank 101 and a multi-chamber fish imaging station 102. The multi-chamber fish imaging station 102 is connected to the fish tank 101 and includes a first imaging assembly 104, a second imaging assembly 105, a third imaging assembly 106, and a fourth imaging assembly 107. A water pump 103 helps circulate the water of the fish tank 101.

A visual cutout 104d is used to show internal elements of the first imaging assembly 104 including an illuminator of a first color 104a, a camera 104b, and an illuminator of a second color 104c. The second imaging assembly 105, the third imaging assembly 106, and the fourth imaging assembly 107 each contain an illuminator of a first color, a camera, and an illuminator of a second color that are not shown.

The system 100 further includes a fish container 108 that occupies space within the multi-chamber fish imaging station 102 and holds a first fish 109 for imaging by the multi-chamber fish imaging station 102. A dotted outline of the first fish 109 is used to illustrate that the first fish 109 is obscured from view by the third image assembly 106. An alternative view of the fish container 108 and a corresponding fish to be imaged is presented in FIG. 2.

A second fish 110 and a third fish 111 (and perhaps other fish) swim within the fish tank 101. A control unit 112 of the system 100 interfaces with elements including the multi-chamber fish imaging station 102 to produce a detection output 114. The control unit 112 can control elements of the system 100 including a lighting controller, an exposure controller, a buffer, a feature selector, and a sea lice detector. The fish may be placed in the first tank 101, and may be observed, by a worker 115.

Stages A through E of FIG. 1 depict an example of the operation of the system 11. Specifically, in stage A, the first fish 109 swims into the fish container 108. When the fish 109 is within the fish container 108 or within the field of view of one or more of the cameras of the multi-chamber fish imaging station 102, the multi-chamber fish imaging station 102 controlled by the control unit 112 can begin a process of imaging the first fish 109.

In some implementations, the field of view of one or more of the cameras may be factored into the design of the multi-chamber fish imaging station 102. For example, the design of the multi-chamber fish imaging station 102 can be such that the field of view affords an obstructed view of the fish container 108 to the image capturing camera.

The four imaging assemblies including the first imaging assembly 104, the second imaging assembly 105, the third imaging assembly 106, and the fourth imaging assembly 107 are arranged around the fish container 108 such that one flat surface of each of the four imaging assemblies is against a corresponding flat surface of the fish container 108. Windows between the flat surfaces of the four imaging assemblies and the fish container 108 are used to view the first fish 109.

Stages B through D describe the process of imaging the first fish 109. Stage B of FIG. 1 involves controlling lights, cameras, and connected components of the multi-chamber fish imaging station 102. The process of lights, cameras and connected components is described below in FIG. 2.

In some implementations, multiple fish are detected within an image. For example, multiple fish are within the fish container 108 and one or more images taken by one or more cameras of the multi-chamber fish imaging station 102 can show multiple fish. The multiple fish can have individual sea lice detections or other visual-based detections (e.g. skin lesions, shortened operculum, or other physical deformities and skin features). The multiple fish can also be processed.

Stage C of FIG. 1 involves feature selection. Feature selection is a form of image analysis performed on one or more images captured by the multi-chamber fish imaging station 102. In some implementations, one or more images can be combined. Image analysis can be performed to detect features on the body of the first fish 109. The image analysis can be performed by various computational methods including algorithms, neural networks, or linear regressions.

In some implementations, the image analysis may be composed of multiple steps. For example, a rough object identifier may be used to detect the first fish 109 within an image. A second object identifier may use the output of the first object identifier to locate objects on the first fish 109 (e.g., sea lice, skin lesions, etc.). The multiple steps can be performed by various computational methods including algorithms, neural networks, or linear regressions.

Stage D in FIG. 1 involves detecting sea lice, or other features, based on performing the image analysis. In some implementations, the image of the body of the fish can be separated from the background. Other pre-processing methods can prepare stages of image analysis. Sea lice surrounding and overlaying the image of the body can be detected and counted and attributed to a specific fish. Tallies of sea lice, or other visible abnormalities, can be kept for individual fish, groups of fish, or whole populations. Detected sea lice data can be used by the system to inform further steps either for mitigation or analytics.

The sea lice on a fish can be detected anywhere within a field of view of a camera within one or more fish imaging assemblies. For example, the sea lice detected on the first fish 109 can be on any part of the body. The part of body, location, or number can be included within the detection output 114.

Stage E in FIG. 1 shows the detection output 114 of the control unit 112. The detection output 114 can include data related to the event of sea lice detection. For example, the detection output 114 can include instructions for sea lice mitigation, data related to the first fish 109, or data related to any sea lice on the first fish 109. For example, the detection output 114 can specify that seven sea lice are on the first fish 109 at specific coordinates or attached to specific features of the fish. The detection output 114 can specify that sea lice mitigation for first fish 109 should be conducted by hand. This data is stored or used within other systems connected to or within system 100, depending on implementation.

The detection output 114 is used to inform an act related to the detection of sea lice. In some implementations, the act can be a form of sea lice mitigation. Techniques can include focused laser light where provided coordinates from the detected sea lice data can be used to target the lasers. Sea lice mitigation can take place in sync with detection or after detection. Detected sea lice data can be stored for future sea lice mitigation, or for analytics, by other devices within the system. In some implementations, the system 100 can store detected sea lice data and inform human workers to proceed with a sea lice mitigation technique. For example, infected fish can be tagged with a location which workers can use to catch and delouse the fish.

The system 100 can also be useful in detecting other conditions. For example, skin lesions on a fish can be detected using similar methods and processes. In some implementations, instead, or in addition to, analyzing images illuminated by different frequencies of light for elements denoting sea lice infection, the system 100 can perform other analysis. For example, the system 100 can analyze images illuminated by different frequencies of light for elements denoting skin lesions or physical deformities such as shortened operculum.

After detection, and any corresponding act related to the detection of sea lice, takes place, the first fish 109 may exit the fish container 108 and resume swimming freely within the fish tank 101. Further detections by the system 100 can take place concerning the second fish 110 after it swims around the fish tank 101 and into the fish container 108.

Once the second fish 110 is within the fish container 108, the system 100 can image and generate detection output for the second fish 110 in a similar manner to the process discussed above in reference to the first fish 109.

Figure 2:
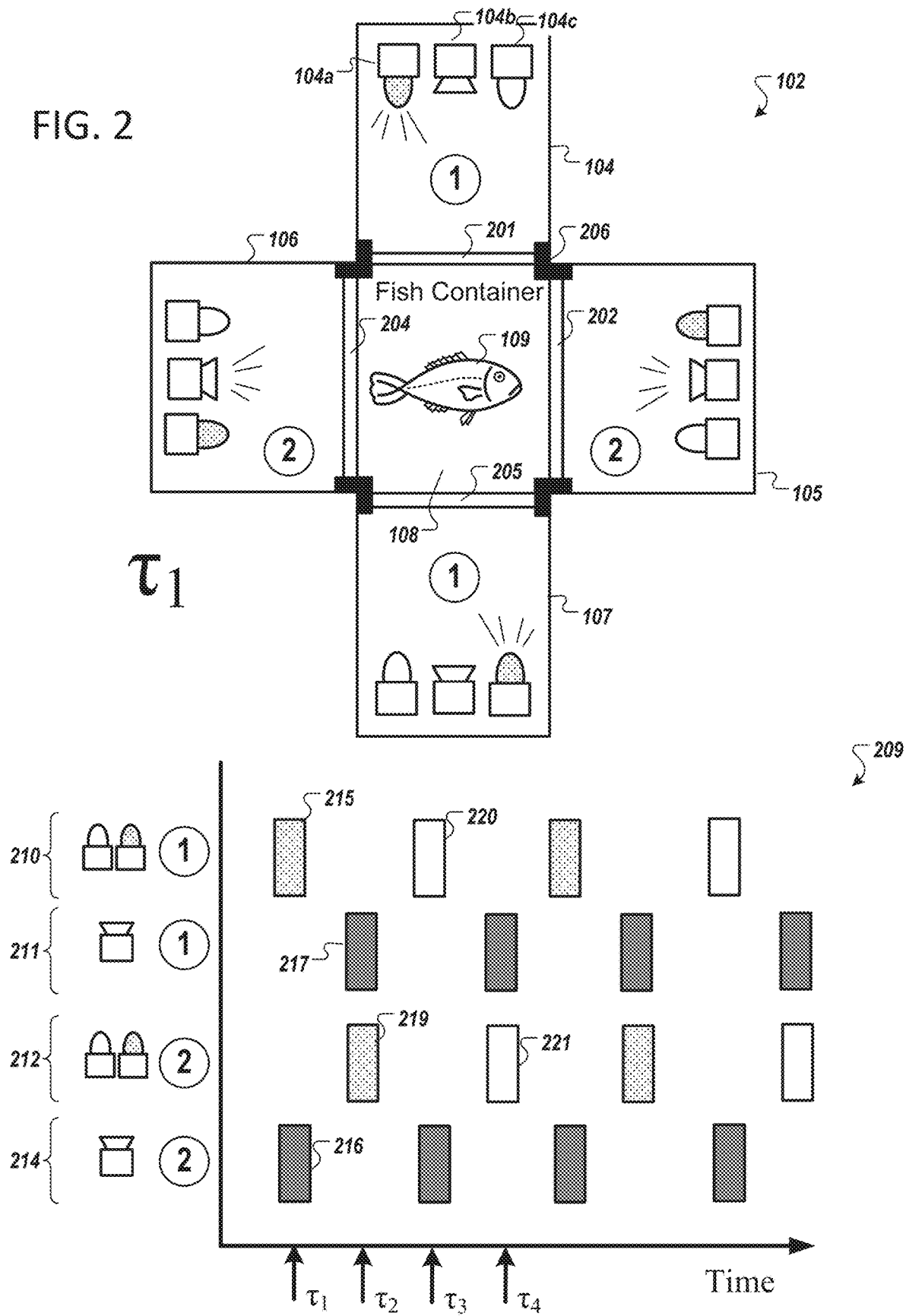
FIG. 2 is a diagram showing a fish imaging station and lighting pattern.

FIG. 2 is a diagram showing the multi-chamber fish imaging station 102 from FIG. 1 along with an exposure pattern 209. The multi-chamber fish imaging station 102 of FIG. 2 includes elements of FIG. 1, namely, the first imaging assembly 104, the illuminator of a first color 104a, the camera 104b, the illuminator of a second color 104c, the second imaging assembly 105, the third imaging assembly 106, the fourth imaging assembly 107, the fish container 108, and the first fish 109.

FIG. 2 shows additional elements of the multi-chamber fish imaging station 102. FIG. 2 includes a first window 201, a second window 202, a third window 204, a fourth window 205 and a fastener 206. The fastener 206, is used with at least three other visually similar fasteners to help secure the imaging assemblies 104, 105, 106, and 107 to the fish container 108.

In the example shown in FIG. 2, the fasteners, including the fastener 206, help secure the windows 201, 202, 204, and 205. The windows 201, 202, 204, and 205 are made of a material to allow viewing into the fish container 108 from a view point of the first imaging assembly 104, the second imaging assembly 105, the third imaging assembly 106, or the fourth imaging assembly 107, respectively.

In some implementations, the windows 201, 202, 204, and 205 are composed of a type of glass or plastic. Cameras within the imaging assemblies are able to detect light emanating from the fish container 108 or elements within the fish container 108. Illuminators within the imaging assemblies are able to illuminate objects within the fish container 108.

The multi-chamber fish imaging station 102 of FIG. 2 is shown at time $\tau_1$. The time $\tau_1$ corresponds to the time $\tau_1$ shown in the exposure pattern 209.

The multi-chamber fish imaging station 102 includes illuminators and cameras. In this implementation, the illuminators are a form of light-emitting diodes (LEDs). Each of the four fish imaging assemblies contain at least two illuminators, one of a first color and one or a second color.

In this example, the first color is blue and the second color is red. Consequently, the illuminator of a first color 104a and the illuminator of a second color 104c can be referred to as the blue illuminator 104a and the red illuminator 104c, respectively.

In other implementations, the first color and the second color are different colors than blue and red, respectively. Radiation outside of the visible spectrum may be used, for example, infrared radiation. Any particular color in the visible spectrum may also be used including cyan, yellow, green, or any other color.

In some implementations, cameras sensitive to different frequencies of light are used. For example, if one of the first color or the second color is infrared, one or more of the cameras may be chosen or be altered in order to be sensitive in the infrared region of light.

The exposure pattern 209 shows a sequence corresponding to illuminators and cameras within the first imaging assembly 104, the second imaging assembly 105, the third imaging assembly 106, and the fourth imaging assembly 107. The first imaging assembly 104 contains the blue illuminator 104a, the camera 104b, and the red illuminator 104c.

Each of the second imaging assembly 105, the third imaging assembly 106, and the fourth imaging assembly 107 also contain a blue illuminator, a camera, and a red illuminator as shown. Items visually similar to item 104a are blue illuminators; items visually similar to 104b are cameras; and items visually similar to 104c are red illuminators.

The blue illuminator 104a in the first imaging assembly is on the opposite side as the blue illuminator in opposing container number 4. In some implementations, the locations of illuminators or cameras can be rearranged. For example, the blue illuminator 104a in item 104 can be directly across from the blue illuminator in item 107.

The exposure pattern 209 shows pairs of fish imaging assemblies that correspond to timing blocks used in the exposure pattern 209. The exposure pattern 209 can be performed by a lighting controller of system 100. Working from top to bottom as shown in FIG. 2, item 210 and item 211 correspond to a first pair of fish imaging assemblies.

The first pair of imaging assembles includes the first imaging assembly 104 and the fourth imaging assembly 107. Item 210 corresponds to both red and blue illuminators of the first pair of imaging assemblies where the visual differences of blocks 215 and 220 distinguish between activation of blue illuminator and red illuminator respectively. Item 211 corresponds to cameras of the first pair of imaging assemblies. Item 212 and item 214 correspond to a second pair of fish imaging assemblies.

The second pair of imaging assemblies include the third imaging assembly 106 and the second imaging assembly 105. Item 212 corresponds to both red and blue illuminators of the second pair of imaging assemblies where, again, the visual differences of blocks 219 and 221 distinguish between activation of blue illuminator and red illuminator respectively. Item 214 corresponds to cameras of the second pair of imaging assemblies.

For simplification, item 210 will be referred to as the first pair of illuminators, item 211 will be referred to as the first pair of cameras, item 212 will be referred to as the second pair of illuminators, and item 214 will be referred to as the second pair of cameras.

At time the first pair of illuminators 210 are illuminating their blue illuminators respectively and the second pair of cameras 214 capture one or more exposures of the first fish 109 inside the fish container 108. This is shown in blocks 215 and 216 respectively. The second pair of cameras 214 capture one or more exposures of the first fish 109 as it is illuminated by blue light.

At a time $\tau_2$, after the first pair of illuminators 210 are no longer activated and the second pair of cameras 214 are no longer capturing data, the first pair of cameras 211 capture one or more exposures and the second pair of illuminators 212 illuminate their blue illuminators respectively. This is shown in blocks 217 and 219 respectively. The first pair cameras 211 capture one or more exposures of the first fish 109 inside the fish container 108 as it is illuminated by blue light.

At a time $\tau_3$, after the first pair of cameras 211 are no longer capturing data and the second pair of illuminators 212 are no longer activated, the first pair of illuminators 210 illuminate their red illuminators respectively and the second pair of cameras 214 capture one or more exposures of the first fish 109. This is shown in block 220 and the corresponding block in the second pair of cameras 214 row respectively. The second pair of cameras 214 capture one or more exposures of the first fish 109 as it is illuminated by red light.

At a time $\tau_4$, after the first pair of illuminators 210 are no longer activated and the second pair of cameras 214 are no longer capturing data, the first pair of cameras 211 capture one or more exposures of the first fish 109 and the second pair of illuminators 212 illuminate their red illuminators respectively. This is shown by the block in the first pair of cameras 211 row and the corresponding block 221 in the second pair of illuminators 212 row, respectively. The first pair cameras 211 capture one or more exposures of the first fish 109 as it is illuminated by red light.

The time difference between illuminating blue illuminator and illuminating red illuminator is 0.005 seconds. The effective alternating rate from blue illuminator to red illuminator (e.g. blocks 215 and 219 to blocks 220 and 221) is 100 Hz.

Lights alternating at a high frequency helps prevent fish within the multi-chamber fish imaging station 102 from getting disoriented by any observed flickering from the lights. The higher the frequency, the less likely it is that the lights of the multi-chamber fish imaging station 102 appear to flicker due to the perceptual refreshing rate of the eyes of fish. Lights may be prevented from alternating above a certain maximum frequency by hardware limitations. Similarly, the alternating rate should not be too high in order to allow enough time for a camera to capture an image of the illumination of one of the one or more alternating lights before another of the one or more alternating lights begins illuminating.

In other implementations, other frequencies are used. For example, frequency of light alternating or camera exposures may vary within a given exposure pattern. For another example, a frequency greater than or less than 100 Hz is used.

After time $\tau_4$, the exposure pattern 209 repeats with the first pair of illuminators 210 illuminating their blue illuminators respectively and the second pair cameras 214 capturing one or more exposures of the first fish 109 as it is illuminated by blue light. This corresponds with the actions at time $\tau_1$.

The exposure pattern 209 proceeds initially from time $\tau_1$ to time $\tau_2$ to time $\tau_3$ to time $\tau_4$. After time $\tau_4$, the exposure pattern 209 once again performs the actions described above corresponding to times $\tau_1$, $\tau_2$, $\tau_3$, and $\tau_4$ in that order.

The process continues for a predetermined amount of time, number of exposures, until switched off by user, until the first fish 109 exits the fish container 108 or the multi-chamber fish imaging station 102, or another event occurs depending on implementation. For example, one or more of the elements included in the multi-chamber fish imaging station 102 can malfunction or report error signals to the control unit 112.

One or more of the cameras in the multi-chamber fish imaging station 102 use a buffer to transfer images captured from exposures. A buffer is useful when capturing relatively large amounts of data in relatively short amounts of time. The buffer allows a system such as the multi-chamber fish imaging station 102 to capture more data in a given period of time than a similar system without a buffer.

Figure 3:
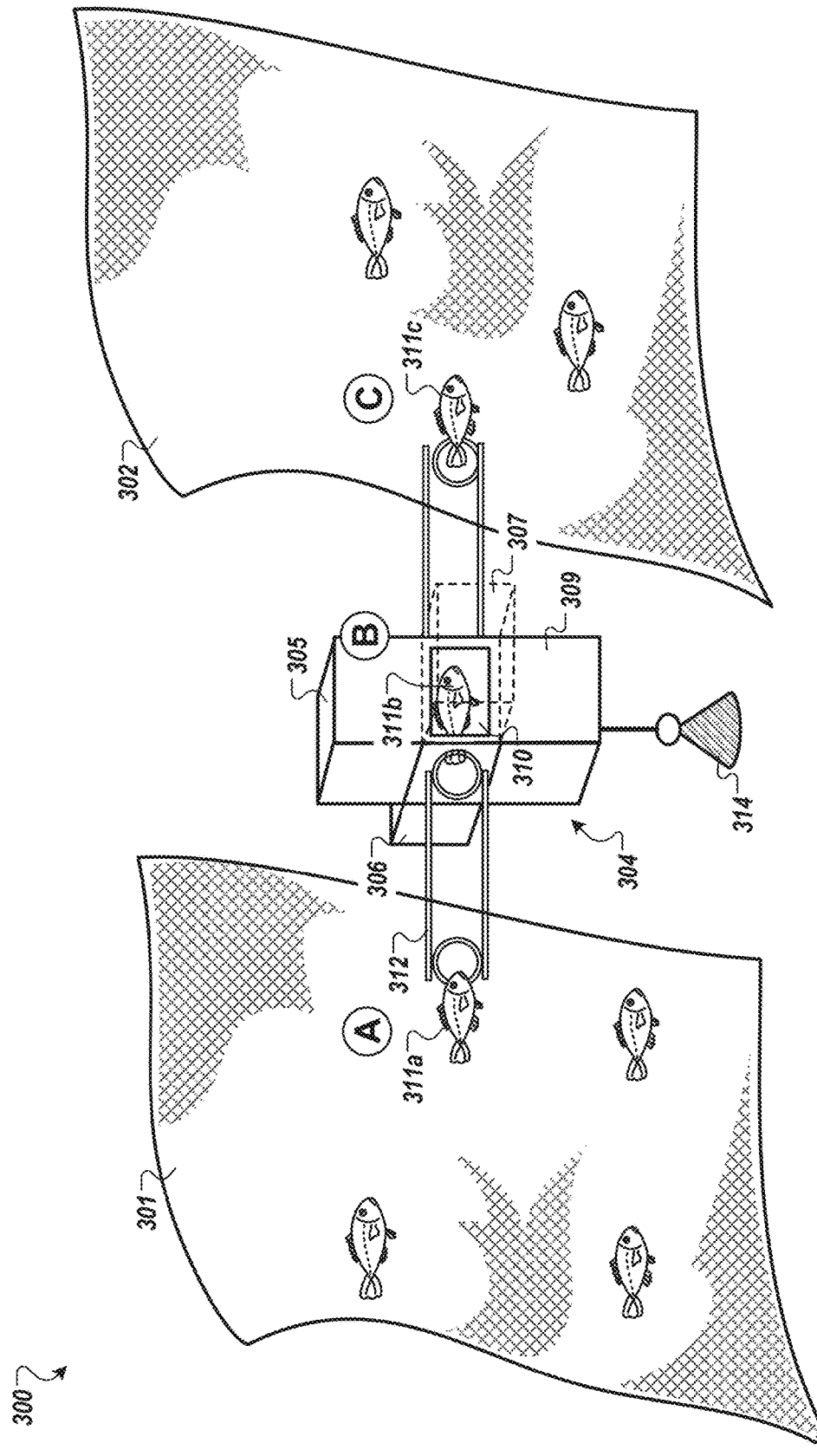
FIG. 3 is a diagram showing an example of a multi-chamber lighting controller system.

FIG. 3 is a diagram showing an example of a multi-chamber lighting controller system 300. The system 300 is shown in an open water environment. Nets 301 and 302 are used in this implementation to direct fish into a multi-chamber fish imaging station 304. The system 300 includes the nets 301 and 302, the multi-chamber fish imaging station 304, a fish 311 (shown in three stages as 311a, 311b and 311c), a tube 312 feeding into the multi-chamber fish imaging station 304, and a weight 314 that provides stability to the multi-chamber fish imaging station 304.

The multi-chamber fish imaging station 304 is another implementation of the multi-chamber fish imaging station 102 shown in FIG. 1 and FIG. 2. The multi-chamber fish imaging station 304 similarly includes a first imaging assembly 305, a second imaging assembly 306, a third imaging assembly 307, and a fourth imaging assembly 309. A fish container 310 contains the fish 311b.

FIG. 3 is shown in three stages. Stage A corresponds to the fish 311a entering the tube 312. Stage B corresponds to the fish 311b within the fish container 310 being imaged or processed by the multi-chamber fish imaging station 304. Stage C corresponds to the fish 311c exiting the multi-chamber fish imaging station 102 through the tube 312.

Stage A of FIG. 3 shows the fish 311a entering the tube 312 from the net 301 enclosure. Other fish are within the net 301. In general, there is no limit to the number of fish able to be processed by the multi-chamber fish imaging station 304.

Stage B of FIG. 3 shows the fish 311b within the fish container 310 being imaged by the multi-chamber fish imaging station 304. The fish 311b is a representation of the fish 311a shown at a later time in a different location. The multi-chamber fish imaging station 304 uses a control unit similar to the control unit 112 of FIG. 1 to image and process the fish 311b. The multi-chamber fish imaging station 304 uses the exposure pattern 209 of FIG. 2 to illuminate and capture images of the fish 311b. The fish 311b is illuminated alternately with red and blue illuminator using the lights of the four imaging assemblies 305, 306, 307, and 309. The fish 311b is imaged by cameras of the four imaging assemblies 305, 306, 307, and 309. The timing of the lights and the cameras is shown in the exposure pattern 209 of FIG. 2.

In reference to FIG. 2, the first pair of illuminators 210 correspond to red and blue illuminators within the first imaging assembly 305 and the fourth imaging assembly 309. The first pair of cameras 211 correspond to cameras within the first imaging assembly 305 and the fourth imaging assembly 309. The second pair of illuminators 212 correspond to red and blue illuminators within the second imaging assembly 306 and the third imaging assembly 307. The second pair of cameras 214 correspond to cameras within the second imaging assembly 306 and the third imaging assembly 307.

The multi-chamber fish imaging station 304 is connected to a control unit similar to the control unit 112 of FIG. 1. The control unit connected to the multi-chamber fish imaging station 304 performs similar actions and obtains detection output. The detection output includes data related to the event of sea lice detection or other detection as discussed above in reference to FIG. 1.

Stage C of FIG. 3 shows the fish 311c exiting the multi-chamber fish imaging station 102 through the tube 312. An incentive can be used to move the fish from the tube 312 to the net 302. Depending on implementation, the incentive can include food or physical forces such as water currents.

In some implementations, the multi-chamber lighting controller system 300 can be floating within a body of water. For example, the multi-chamber lighting controller system 300 can be submerged within a body of water containing one or more fish. The one or more fish contained within the body of water may be processed by the multi-chamber lighting controller system 300.

Figure 4:
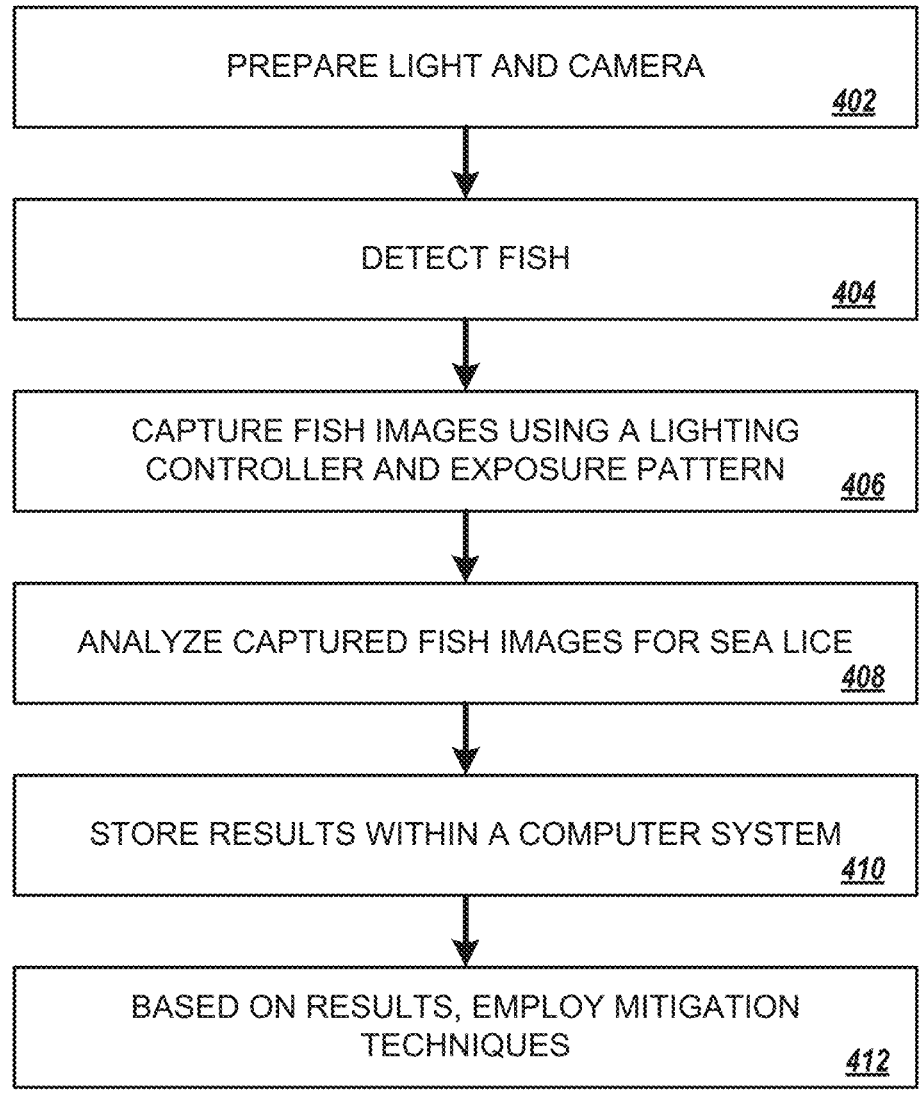
FIG. 4 is a flow diagram illustrating an example of a process for sea lice detection using a lighting controller.

FIG. 4 shows a process 400 for sea lice detection using a lighting controller.

The process 400 includes preparing an illumination system and a camera system (402). For example, control unit 112 from FIG. 1 can select the wavelength used for illuminating the first fish 109.

The process 400 includes detecting fish motion within the field of view of the camera system (404). For example, as the first fish 109 swims within the field of view of the camera 104b, or a camera from one of the other imaging assemblies in the multi-chamber fish imaging station 102, the lights of the multi-chamber fish imaging station 102 and the cameras of the multi-chamber fish imaging station 102 coordinate through signals sent from control unit 112 in a manner similar to those discussed in FIG. 2.

The process 400 includes capturing fish images using a lighting controller and exposure pattern (406). For example, a specific exposure pattern similar to pattern 209 of FIG. 2 can be used with one or more blue illuminator LEDs of the multi-chamber fish imaging station 102 and one or more red illuminator LEDs of the multi-chamber fish imaging station 102 functioning as an illumination system and one or more cameras of the multi-chamber fish imaging station 102 functioning as one or more devices used to capture fish images.

The process 400 includes analyzing captured fish images for sea lice (408). For example, the control unit 112 can gather images from one or more elements of data captured by one or more cameras of the multi-chamber fish imaging station 102 and perform image analysis to detect sea lice.

The process 400 includes storing results within a computer system (410). For example, control unit 112 can store the results of the image analysis involving one or more elements of data captured by one or more cameras of the multi-chamber fish imaging station 102.

The process 400 includes employing mitigation techniques based on results (412). The mitigation techniques can include targeted treatments which can be comprised of lasers, fluids, or mechanical devices such as a brush or suction. For example, the control unit 112 can activate lasers to focus intense light on a fish to remove sea lice from the fish. The lasers can use sea lice location data gleaned from the image analysis performed. The control unit 112 can also delegate the mitigation to other systems or devices (e.g., other computer systems, humans, etc.).

Figure 5:
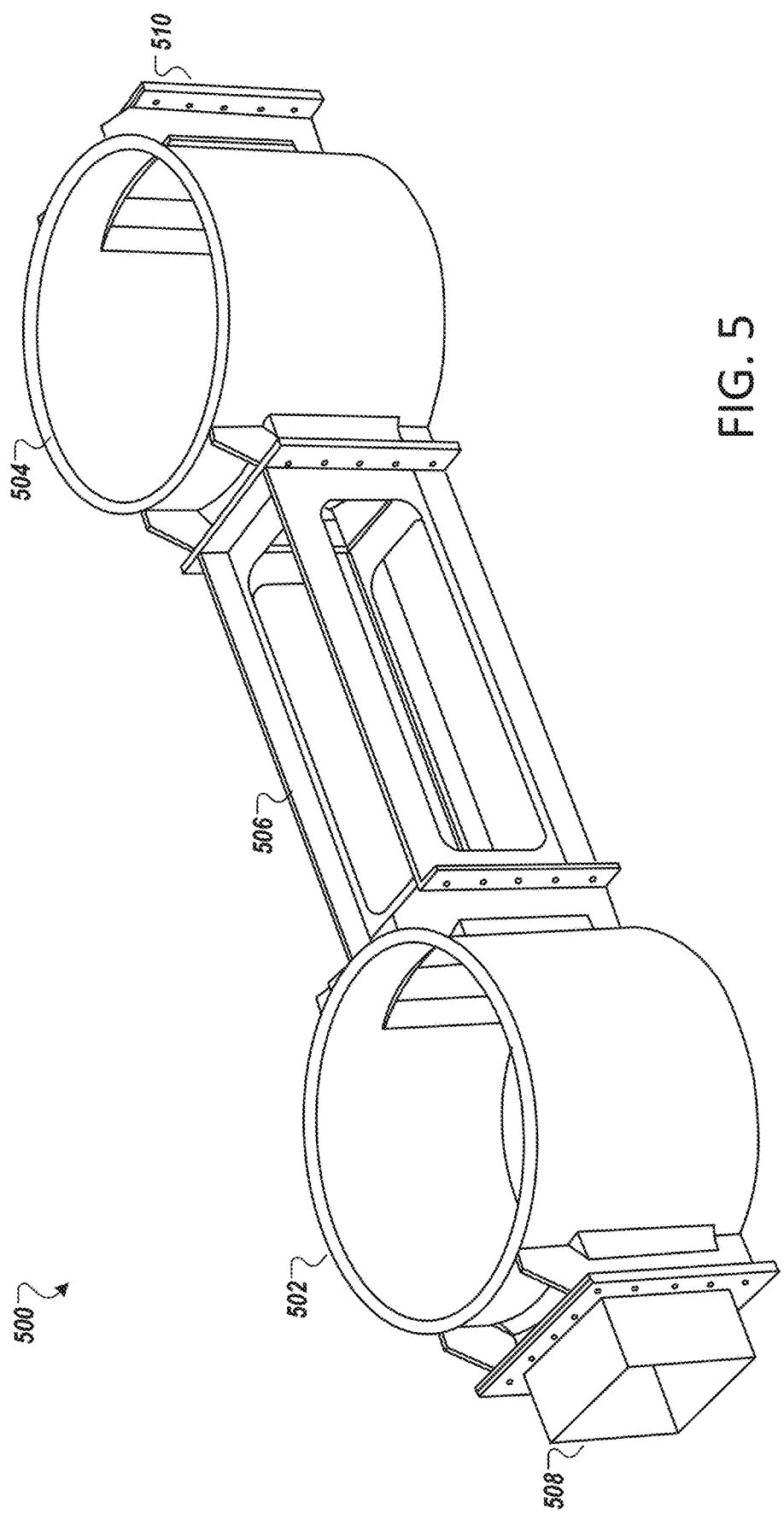
FIG. 5 is a diagram showing an example of a second tank compatible with a multi-chamber lighting controller system.

FIG. 5 is a diagram showing an example of a second tank 500 compatible with a multi-chamber lighting controller system. The second tank 500 includes a first cylindrical tank 502 connected to a second cylindrical tank 504 by a fish container 506. The fish container 506 has at least four viewing angles. The second tank 500 is designed to hold water, enabling one or more fish to swim in it. In practice, a fish may swim into either a first opening 508 or a second opening 510. Depending on implementation, doors on the first opening 508 or the second opening 510 can be controlled to prevent one or more fish from exiting.

An example implementation is considered where a fish enters from the first opening 508. The second tank 500 is filled with a certain level of water to enable the fish to swim through the first opening 508 and into the first cylindrical tank 502. Once within the first cylindrical tank 502, doors on the first opening 508 are closed to ensure that the fish does not exit back through the first opening 508. The fish may be stored in the first cylindrical tank for a period of time before continuing on to the fish container 506.

When the fish is in the fish container 506, a multi-chamber fish imaging station, such as the multi-chamber fish imaging station 102 of FIG. 1, may be used to capture images of the fish. The process of capturing one or more images of the fish and illuminating the fish with one or more lights is discussed above in reference to FIG. 1 and FIG. 2 in particular.

The fish may move from the fish container 506 to the second cylindrical tank 504. The fish may be stored in the second cylindrical tank 504 for a period of time before continuing on through the second opening 510.

In some implementations, additional doors may be used to control the movement of a fish within the second tank 500. For example, doors can be controlled between the first cylindrical tank 502 and the fish container 506. The doors may be used to control at what time, how many, or what type of fish continue on to the fish container 506. In some implementations, similar doors may be fitted onto the opening between the fish container 506 and the second cylindrical tank 504.

In some implementations, doors are not used. For example, one or more fish can swim through the first opening 508 and choose whether to swim back through the first opening 508 or continue through the first cylindrical tank 502 to the fish container 506. The fish, assuming its size is not a factor, is able to turn around at any time or continue in a given direction. In some cases, doors are fitted to either the first opening 508 or the second opening 510 but are not controlled to close.

In some implementations, a fish enters from the second opening 510 and proceeds into the second cylindrical tank 504, then the fish container 506. The order presented here is not meant to limit the possible usage of the second fish tank 500.

In some cases, pumps or other aids to fish movement may be used within the second fish tank 500. For example, food may be used to lure the fish into portions of the second fish tank 500, such as the first opening 508. For another example, pumps may be used to circulate the water through the second fish tank 500.

In some implementations, one or more of the fish tanks discussed in this application, such as the second fish tank 500, can be used within an open water environment. For example, the second fish tank 500 can be situated within a body of water where the body of water contains one or more fish.

Figure 6:
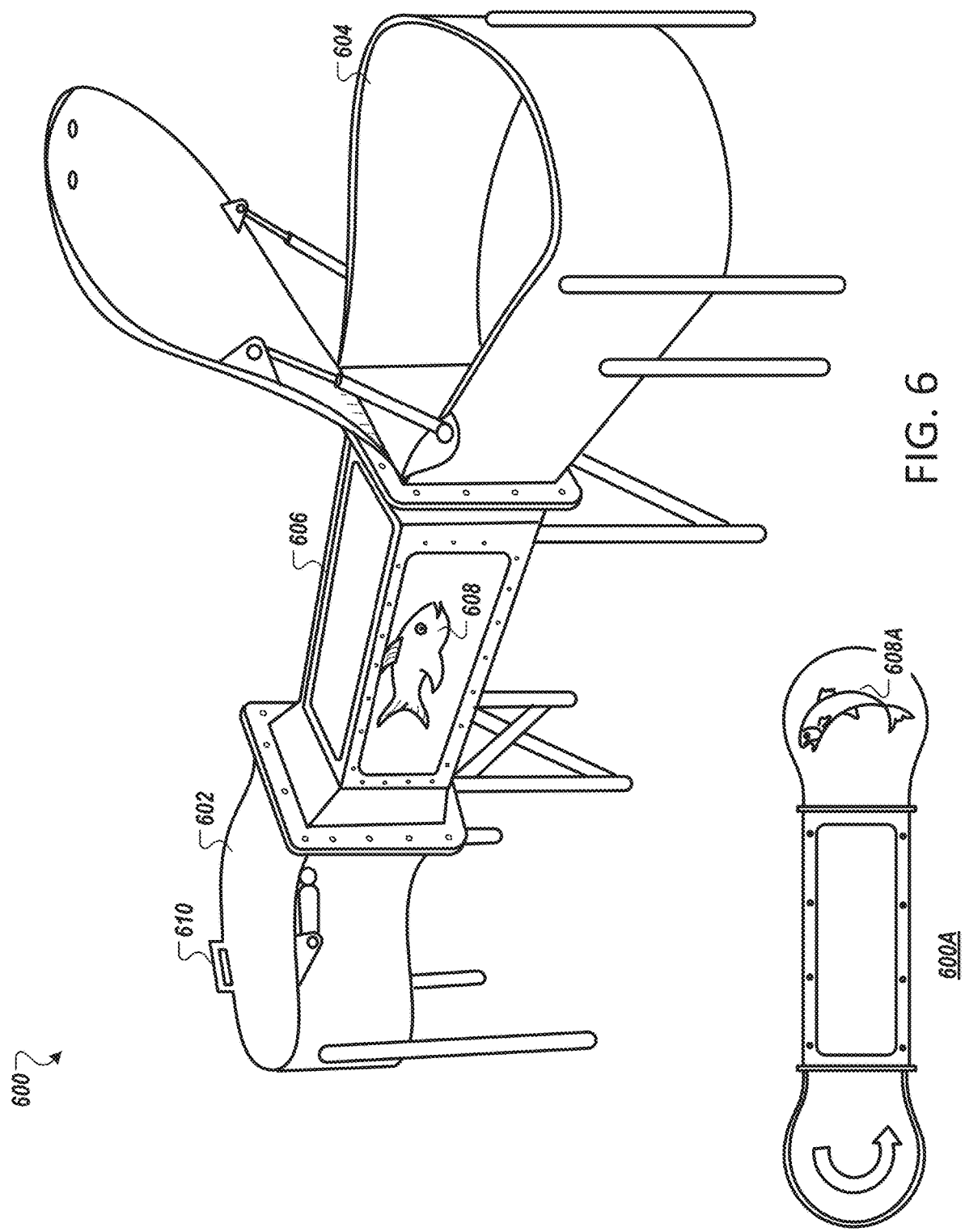
FIG. 6 is a diagram showing an example of a third tank compatible with a multi-chamber lighting controller system.

FIG. 6 is a diagram showing an example of a third tank 600 compatible with a multi-chamber lighting controller system. The third tank 600 includes a first enclosure 602 connected to a second enclosure 604 by a fish container 606.

A handle 610 is affixed to a lid of the first enclosure 602. The handle can be used, for instance, in opening the first enclosure 602 and placing a fish 608 within the third tank 600. The third tank 600 is designed to hold water, enabling one or more fish to swim in it.

An example implementation is considered where the fish 608 enters from the first enclosure 602 into the fish container 606. A multi-chamber fish imaging station, such as the multi-chamber fish imaging station 102 of FIG. 1, may be used to capture images of the fish 608. The process of capturing one or more images of fish and illuminating fish with one or more lights is discussed above in reference to FIG. 1 and FIG. 2 in particular.

The fish 608 may move from the fish container 606 to the second enclosure 604. The fish 608 may be stored in the second enclosure 604 for a period of time. Similarly, the fish 608 may be stored in the first enclosure 602 for a period of time. The fish 608, or any other fish, may swim from the first enclosure 602 to the second enclosure 604 passing through the fish container 606. The fish 608, or any other fish, may also swim from the second enclosure 604 to the first enclosure 604 passing through the fish container 606. A multi-chamber fish imaging station may capture one or more images of the fish 608.

Item 600A shows a view from above of the third tank 600. A fish 608A is shown turning within an enclosure. The shape of the first enclosure 602 or the second enclosure 604 can be shaped to allow a certain size and shape of fish to turn.

In some implementations, doors may be used to control the movement of a fish within the third tank 600. For example, doors can be controlled between the first enclosure 602 and the fish container 606. The doors may be used to control at what time, how many, or what type of fish continue on to the fish container 606. In some implementations, similar doors may be fitted onto the opening between the fish container 606 and the second enclosure 604.

In some implementations, doors are not used. For example, one or more fish can choose whether to remain in the first enclosure 602 or the second enclosure 604 or continue through the fish container 606. The fish, assuming its size is not a factor, is able to turn around at any time or continue in a forwards direction.

In some cases, pumps or other aids to fish movement may be used within the third fish tank 600. For example, food may be used to lure the fish into portions of the third fish tank 600, such as the fish container 606. For another example, pumps may be used to circulate the water through the third fish tank 600.

Figure 7:
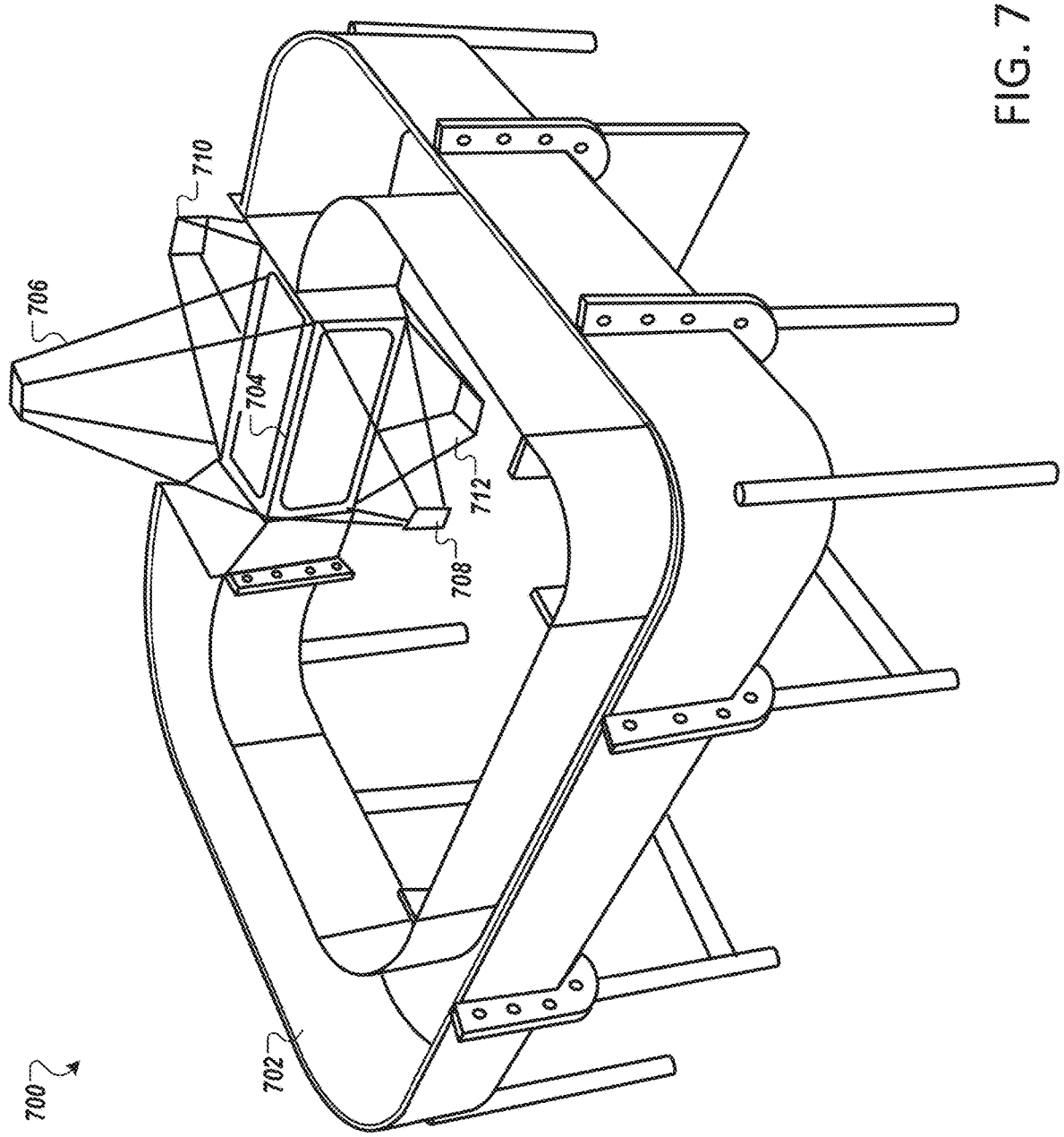
FIG. 7 is a diagram showing an example of a fourth tank compatible with a multi-chamber lighting controller system.

FIG. 7 is a diagram showing an example of a fourth tank 700 compatible with a multi-chamber lighting controller system. The fourth tank 700 includes a track 702 that connects to a fish container 704 at either ends of the fish container 704. The fourth tank 700 is designed to hold water, enabling one or more fish to swim in it. The track 702 is closed such that one or more fish, starting from a first location on the track 702, may swim in one direction and come back to the first location.

Items 706, 708, 710, and 712 show possible viewpoints that a multi-chamber lighting controller system, such as the multi-chamber lighting controller 102 of FIG. 1, may use to capture one or more images of the fish as it swims from the track 702 through the fish container 704.

In some implementations, doors may be used to control the movement of a fish within the fourth tank 700. For example, doors can be controlled between the track 702 and the fish container 704. The doors may be used to control at what time, how many, or what type of fish continue on to the fish container 704.

In some implementations, doors are not used. For example, one or more fish can swim through the fish container 704. In some implementations, a fish may be able to turn around or continue in a given direction. In some cases, pumps or other aids to fish movement may be used within the fourth fish tank 700. Food may also be used to lure the fish into portions of the fourth fish tank 700, such as the fish container 704. In some cases, pumps may be used to circulate the water through the fourth fish tank 700.

In some implementations, a fish pump within a multi-chamber lighting controller system uses other methods to help circulate the water of a fish tank. For example, the fish pump 103 can use water jets to eject water in a direction within the fish tank 101. The water ejected in the direction within the fish tank 101 can then help circulate the water in the fish tank 101 in the direction. For another example, propellers can be used by a fish pump to move the water within the fish tank. In general, any method of moving water within a fish tank can be used to help circulate the water and enable easier fish movement.

In some implementations, a fish pump is not used. For example, the fish pump 103 in FIG. 1 can be removed and the fish tank 101 can still be used. In some cases, the fish tank 101 can be used without an external aid to water circulation. The one or more fish within the fish tank 101 can swim within the fish tank 101.

In some implementations, the fish tank 101 is arranged in an ellipse and is filled with water allowing fish to swim freely. For example, the first fish 109, the second fish 110, and the third fish 111 can swim within the fish tank 101. The first fish 109 is a fish to be imaged by the multi-chamber fish imaging station 102. The first fish 109 is within the fish container 108. The fish container 108 may also be referred to as a fish imaging container. The fish container 108 is a rectangular prism with windows on four sides and openings on the other two allowing a fish to swim through. The fish container 108 is obscured from view by the first image assembly 104 and the third image assembly 106.

In some implementations, a fish container is any particular shape. For example, the fish container 108 can resemble a box. Alternatively, a fish container may be a hollow cylinder with openings on either end. The arrangement of lights and cameras may change depending on the shape of the container. For example, in the case of a cylindrical fish container, three imaging assemblies may be used instead of four. The three imaging assemblies may be placed in a triangular fashion with each assembly occupying a vertex of a triangle the center of which is the container holding the fish.

In some implementations, the first imaging assembly 104 is positioned over the fish container 108. The second imaging assembly 105 is positioned on an inside wall of the fish tank 101. The third imaging assembly 106 is positioned on an outside wall of the first tank 101. The fourth imaging assembly 107 is positioned under the first tank 101.

In some implementations, chambers of a multi-chamber imaging station capture different viewpoints of a fish. For example, the first imaging assembly 104 is a box on top of a portion of the fish tank 101. A bottom flat surface of the first imaging assembly 104 is transparent such that the elements of the first imaging assembly 104, including the illuminator of a first color 104a and the illuminator of a second color 104c as well as the camera 104b, have a line of sight to the first fish 109 as it passes underneath. The second imaging assembly 105 views the first fish 109 as it passes from right to left. The third imaging assembly 106 views the first fish 109 as it passes from left to right. The fourth imaging assembly 107 views the first fish 109 as it passes overhead. The flat surface of the first imaging assembly 104 is one side of the fish container 108.

In some implementations, the multi-chamber fish imaging station 102 is arranged in an alternate setup. For example, instead of 4 imaging assemblies, the multi-chamber fish imaging station 102 may have 3. In another example, the windows of each assembly that face the first fish 109 are a part of the fish container 108. In some cases, the windows can be made of glass, plastic or other transparent or translucent material.

In some implementations, one or more of the fish imaging assemblies contain disparate internal elements. For example, the first imaging assembly 104 may contain two lights (e.g. the illuminator of a first color 104a and the illuminator of a second color 104c) and the camera 104b while the second imaging assembly 105 may contain three lights and a camera. The third in the second imaging assembly 105, in this example, may be used for background lighting.

In some implementations, the detection of sea lice can include specific species of sea lice. For example, several species of ectoparasitic copepods of the genera *Lepeophtheirus* and *Caligus*. The type of fish being analyzed can affect the process of sea lice detection. For example, upon detection of a salmon, a system can adapt a system of detection for the detection of *Lepeophtheirus salmonis*—a species of sea lice which can be especially problematic for salmon. In some implementations, a detection of a specific species of sea lice can be separated from other sea lice detections. For example, a detection of *Lepeophtheirus salmonis* can be separated from sea lice detections of *Caligus curtis* and *Lepeophtheirus hippoglossi*.

In some implementations, the illuminator of a first color 104a and the illuminator of a second color 104c are LEDs transmitting light within specific frequency ranges. The illuminator of a first color 104a transmits light within the wavelength range of 440 nm to 485 nm and appears blue. The blue illuminator region is distinct from the cyan light region in that the blue illuminator region stretches from 450 nm wavelength up to 485 nm wavelength, while the wavelength of cyan light starts at 485 nm wavelength and increases to 500 nm. Blue illuminator can have peak power between 450 and 485 nm wavelengths while cyan light can have peak power between 485 nm and 500 nm wavelengths. Furthermore, the light of a blue LED used in the lighting controller can be concentrated towards the lower wavelengths of the blue illuminator region creating a separation of blue illuminator to cyan light. The separation can be thousands of gigahertz or greater which equates to roughly ten percent of the entire visible spectrum. A greater separation between red illuminator (e.g., 625 nm to 780 nm wavelength) and blue illuminator (e.g., 450 nm to 485 nm wavelength) can result in greater accuracy in sea lice detection as well as detections of skin lesions, shortened operculum or other physical deformities and skin features.

In some implementations, other frequencies are used. For example, instead of the blue and red frequencies described above, cyan and infrared illuminator may be used. In general, any frequency light may be produced by the illuminator of a first color 104a or the illuminator of a second color 104c. Any frequency light includes all possible visible spectrum frequencies as well as frequencies outside the visible spectrum such as ultraviolet or infrared, for example.

In some implementations, the lights used in the multi-chamber fish imaging station 102 can be non-LED. For example, instead of LEDs, incandescent light bulbs can be used. Other forms of light production may be used for either a first color or a second color light.

In some implementations, the wavelengths can be set before imaging events take place. For example, an LED can be installed which emits light in the blue visible spectrum of light with wavelengths between 440 nm and 485 nm. Another LED can be installed which emits light in the red visible spectrum of light with wavelengths between 620 nm and 750 nm. In general, it can be advantageous to use dissimilar frequencies, one with longer wavelength (towards infrared) and another with shorter wavelength (towards ultraviolet). Lights reaction in water should be considered and can prevent some frequencies of light from propagating effectively and therefore functioning properly as a primary illuminator.

In some implementations, the frequency of the illumination LEDs can be tuned remotely. For example, revolving LED wheels can be used to pick from a variety of LEDs. LEDs can be chosen based on effectiveness. Criteria can include an ability to produce images likely to result in true positive sea lice detection.

In some implementations, the illuminator of a second color 104c transmits light within the wavelength range of 620 nm to 750 nm and appears red. Frequency can be tuned to maximize frequency space separation while retaining visible light for camera image capture and minimizing environmental disruptions (e.g., light absorption, light scattering).

The camera 104b captures visible light images along with other cameras in the other three imaging assemblies. The exposures of camera 104b and the other cameras are timed in relation to illumination of other lights in the multi-chamber fish imaging station 102 (e.g., the illuminator of a first color 104a, the illuminator of a second color 104c, or corresponding lights in one or more of the second imaging assembly 105, the third imaging assembly 106, and the fourth imaging assembly 107). The exposure of camera 104b and illumination of any lights is controlled by the control unit 112. Details of a particular method of exposure is shown in FIG. 2.

In some implementations, secondary lights can be used. Secondary lights can provide additional light for exposures of the camera 104b. For example, secondary lights can be used to brighten an image of the fish. This can be useful in situations where surface light is minimal. Secondary lights can also enable the ability to control the ambient light of an image capture which can be useful in controlling for varying water conditions or location conditions.

In some implementations, more or fewer lights can be used. For example, in some situations, secondary lights may not be required. These situations may include applications where background light is sufficient or does not pose challenges for sea lice detection. Less illuminators can also be used by installing custom image filters to capture an image or images.

In some implementations more or less than two lights can be used for illuminating the fish. For example, instead of the blue illuminator 104a and the red illuminator 104c, a light of a different color or frequency can be added. The illumination of any additional light can be captured by a camera as images as described above.

In some implementations, more than one camera can be used in an imaging assembly. For example, instead of the camera 104b being the sole camera in the first imaging assembly 104, a second or third camera in addition to the camera 104b may be added. In some implementations, an additional camera can capture alternate angles of a subject. For example, an additional camera within the fish tank 101 or connected to the multi-chamber fish imaging station 102 can alternate angles of the first fish 109.

In some implementations, the illumination from lights can be of any frequency. For example, instead of blue and red illuminators, infrared and ultraviolet light may be used by the multi-chamber fish imaging station 102. The cameras used to capture images of scenes lit by illuminators can have the ability to capture the specific frequency of the illuminator. For example, if an illuminator is illuminating ultraviolet light on the subject (e.g. the first fish 109, etc.), a camera can have the ability to sense and record the ultraviolet light within an image. Any frequency can be used within an exposure pattern corresponding or similar to the exposure pattern 209 of FIG. 2.

In some implementations, more than one fish can be processed within a system like system 100. For example, the fish tank 101 in FIG. 1 holds more than one fish. The additional fish may also be imaged and processed by the multi-chamber fish imaging station 102. Both the first fish 109 and any additional fish can be processed by control unit 112 and data representing their respective detection results may be contained within the resulting detection output 114 or a separate detection output. Any number of fish can be processed in this way. Possible limitations to the number of fish processed can exist in hardware or software used.

In some implementations, more than one exposure pattern can be used. For example, variations of the exposure pattern 209, with different timings of the elements therein, may be used. A variation of the exposure pattern 209 can be used by a system such as the system 100 in FIG. 1. In some implementations, patterns can be used based on external or internal stimuli. For example, a certain kind of fish may prompt a specific exposure pattern. In some situations, it may be beneficial or desirable to choose one exposure pattern over another or a specific combination of one or more exposure patterns.

In some implementations, the exposure patterns may contain an additional light or additional lights. The exposure pattern 209 may be modified with the addition of a light. In some implementations, more than one light is added. For example, in exposure pattern 209, an additional light within the first imaging assembly 104 can fire after the block 215 at a time after time $\tau_1$ and before $\tau_2$. The additional light, in some implementations, may illuminate a given subject in a separate or similar frequency to the frequencies illuminated by existing light sources. For example, the additional light can illuminate in ultraviolet. An exposure pattern may be altered accordingly. For example, the illumination of the ultraviolet light source can be captured by an exposure after an existing exposure in the exposure pattern 209 (e.g. block 216).

In some implementations, the exposure patterns may contain an additional camera or additional cameras. The exposure pattern 209 may be modified with the addition of a camera. In some implementations, more than one camera may be added. For example, in exposure pattern 209, an additional camera can be used to capture exposures after or with exposure shown in block 216. The additional camera can capture an exposure of a given subject in a separate or similar frequency to the frequencies illuminated by the existing lights of the first pair of illuminators 210. For example, the additional camera can capture exposures of light in the ultraviolet spectrum. An exposure pattern can be altered. For example, an exposure capturing ultraviolet light can be added to the exposure pattern 209 after an existing exposure in the exposure pattern 209 (e.g. block 216).

In some implementations, a system can alter detection techniques based on detection circumstances. For example, in the case of various fish species, the detection method can be altered to use algorithms associated with the species or other types of frequency of illuminator light. Furthermore, water quality can be a circumstance of detection that could be registered by the system and alter following sea lice detections. For example, if the water is murky, an increase in the brightness or quantity of lights used can be instigated and carried out by the system. Adjusting the lighting based on fish environment conditions can be a part of the illuminator controller or a separate subsystem depending on implementation. Detection techniques can also be altered by the detection of a species of fish. For example, different species could be considered a detection circumstance and registered by the system. The registering of different species could invoke different forms of detection methods.

In some implementations, an alteration in sea lice detection method can result in alterations of sea lice detection output and results. For example, if a sea lice detection method was altered based on the sighting of a particular species of salmon, the output can be altered to save the sea lice detection data with species-specific feature recognition. The output can also be altered to include mitigation techniques tailored to the particular species of fish (e.g. salmon, etc.).

In some implementations, more than two modes of light can be used in an exposure pattern. For example, instead of blue and red illuminator, an exposure pattern can use a blue illuminator, a red illuminator, and a yellow light.

In some implementations, other ranges of light can be used to illuminate the subject for image capture. For example, instead of visible light, a system can use ultraviolet light.

In some implementations, a lighting controller can use a blue illuminator composed of light with multiple wavelengths. For example, a graph of output power versus wavelength for blue illuminator can resemble a Gaussian shape with peak power at 465 nm wavelength and 10% power at 450 nm and 495 nm wavelengths. Other implementations could have different proportions of wavelengths or different ranges of wavelengths. For example, a graph of output power versus wavelength for blue illuminator can resemble a Gaussian shape with peak power at 460 nm and 0% power at 455 nm and 485 nm wavelengths.

In some implementations, a lighting controller can use a red illuminator composed of light with multiple wavelengths. For example, a graph of output power versus wavelength for red illuminator can resemble a Gaussian shape with peak power at 630 nm wavelength and 10% power at 605 nm and 645 nm. Other implementations could have different proportions of wavelengths or different ranges of wavelengths. For example, a graph of output power versus wavelength for red illuminator can resemble a Gaussian shape with peak power at 635 nm and 0% power at 610 nm and 640 nm wavelengths.

In some implementations, the windows 201, 202, 204, and 205 shown in FIG. 2 are chosen based on the frequency used for the lights of the imaging assemblies or the cameras of the imaging assemblies. For example, if visible light is used for the lights of the imaging assemblies and the cameras of the imaging assemblies are sensitive to visible light, the windows 201, 202, 204, and 205 are configured to allow visible light to pass through. For another example, if high frequency radiation is used for the lights of the imaging assemblies and the cameras of the imaging assemblies are sensitive to the high frequency radiation, the windows 201, 202, 204, and 205 are configured to allow the high frequency radiation to pass through. In examples of visible light, the windows may be made of glass or plastic depending on implementation. In examples of high frequency radiation, the windows may be made of a type of metal depending on implementation.

In some implementations, the fasteners including the fastener 206 involve bolts, screws, welds, or nails. For example, the fastener 206 may be a type of L bracket that holds one or more screws. The fasteners including the fastener 206 may be made out of one or more of a variety of materials including metal, plastic, glass, or wood.

In some implementations, fasteners including the fastener 206 are not used. For example, the multi-chamber fish imaging station 102 may be an arrangement of material that includes a central area and areas spatially adjacent to the central area.

In some implementations, a different number of lights are used. For example, instead of the blue illuminator 104a and the red illuminator 104c, three or more lights can be used. The exposure pattern 209 can change accordingly to accommodate additional lights. In some cases, this may involve repeating the pattern shown in the exposure pattern 209 to include the other lights.

In some implementations, the time difference between elements in the exposure pattern 209 are different. For example, the time between time $\tau_1$ and $\tau_2$ can be more or less than 0.005 seconds. In some cases, the time difference between time $\tau_1$ and $\tau_2$ can be different than the time difference between time $\tau_2$ and $\tau_3$.

In some implementations, a gap between sequential illuminations can be inserted. For example, after the illumination of the first pair of illuminators 210 but before the illumination of the second pair of illuminators 212, the exposure pattern 209 can contain a 1 millisecond (ms) period of non-illumination. In some implementations, periods of non-illumination can be inserted to prevent a subject being illuminated simultaneously by the first pair of illuminators 210 and the second pair of illuminators 212.

In some implementations, this delay can be inserted to transfer an image to a storage device or somewhere within memory. For example, the delay can be 40 ms. Different implementations can use different delay lengths. In some implementations, a delay of a determined amount of time is inserted between each of the actions corresponding to time $\tau_1$, $\tau_2$, $\tau_3$, and $\tau_4$ as well as subsequent actions.

In some implementations, the exposure pattern 209 contains periods of alternating between the first pair of illuminators 210 and the second pair of illuminators 212 and the colors therein without cameras of the multi-chamber fish imaging station 102 capturing images. This alternating can be advantageous as it can help maintain a more steady illumination level while eliminating the need for the cameras of the multi-chamber fish imaging station 102 to collect exposures at a high frequency. For example, the first or second pairs of cameras 211 or 214 may capture exposures every tenth iteration within a continuing alternating process of the first pair of illuminators 210 to the second pair of illuminators 212 and back to the first pair of illuminators 210. For example, alternating at a rate of up to 120 Hz, the alternating lights of the multi-chamber fish imaging station 102 may appear similar to steady non-flashing lights while the cameras of the multi-chamber fish imaging station 102 capture images at a frequency less than 120 Hz and are not overly strained. This can be advantageous as steady non-flashing lights are more attractive to some fish than flashing lights.

In some implementations, the cameras in the multi-chamber fish imaging station 102 do not use buffers. For example, the camera 104b captures data from an exposure of the first fish 109 and directly transfers the data to the control unit 112 for processing.

In some implementations, an incentive is used to motivate a fish to move to a place to be imaged or processed. For example, the fish 311a may be given an incentive to enter the tube 312. Food can be used within the tube 312 to lure the fish 311a towards the multi-chamber fish imaging station 304. For another example, force from a generated current of water that flows from one side of the tube 312 to another can be used to physically push the fish 311a into and out of the tube 312. In some implementations, the above incentives can be applied to the fish tank 101 of FIG. 1. For example, a flow of water is used to incentivize the fish to go through the multi-chamber fish imaging station 102.

The process 400 can also be useful in detecting other conditions. For example, skin lesions on a fish can be detected using similar methods and processes. In some implementations, instead, or in addition to, analyzing images illuminated by different frequencies of light for elements denoting sea lice infection, a system can perform other analysis. For example, a system can analyze images illuminated by different frequencies of light for elements denoting skin lesions or physical deformities such as shortened operculum.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. An apparatus comprising:
    an imaging container attached to a fish enclosure, the imaging container arranged to allow for fish in the fish enclosure to swim against a current that is generated to flow through the imaging container, the imaging container comprising two or more fish imaging assemblies, each imaging assembly comprising:
        a camera for generating images of fish that swim through the imaging container, and
        a pair of lights including a light of a first color and a light of a second color each configured to illuminate the fish that swim through the imaging container; and
    a control unit that synchronizes (i) generating a sequence of images using the camera in a first imaging assembly when the pair of lights in the first imaging assembly are not illuminated and when an alternating one of the pair of lights in a second imaging assembly is illuminated, and (ii) generating a sequence of images using the camera in the second imaging assembly when the pair of lights in the second imaging assembly are not illuminated and when an alternating one of the pair of lights in the first imaging assembly is illuminated.

2. The apparatus of claim 1, wherein the first fish imaging assembly and the second fish imaging assembly of the two or more fish imaging assemblies are perpendicular to each other and are disposed on different sides of the imaging container.

3. The apparatus of claim 1, wherein the control unit includes a machine learning model to inform controlling one or more lights of the first fish imaging assembly to activate the light of the first color during the exposure of the camera of the second fish imaging assembly.

4. The apparatus of claim 1, wherein the apparatus is deployed in open water.

5. The apparatus of claim 1, wherein the control unit obtains one or more images generated in the imaging container and processes the one or more images to determine whether the fish is likely affected by a particular condition.

6. The apparatus of claim 5, wherein the control unit is configured to store the one or more images generated in the imaging container in an image buffer.

7. The apparatus of claim 5, wherein the control unit is configured to access a machine learning model trained to determine whether the fish is likely affected by the particular condition.

8. The apparatus of claim 7, wherein the machine learning model is trained to determine the particular condition, wherein the particular condition comprises one or more of a sea lice infection, an occurrence of a lesion, or a physical deformity.

9. The apparatus of claim 1, wherein the pair of lights feature an alternating rate of light pulses greater than 60 Hz.

10. The apparatus of claim 1, wherein the control unit is configured to:
    generate an image of the fish swimming through the imaging container using the exposure of the camera.

11. The apparatus of claim 1, wherein the fish enclosure includes straight and curved sections.

12. The apparatus of claim 1, wherein the control unit is configured to access a machine learning model trained to generate control signals for illuminating one of the first color or the second color or controlling an exposure of one or more cameras.

13. The apparatus of claim 1, wherein the control unit comprises a non-transitory, computer-readable medium storing one or more instructions executable by a computer system.

14. The apparatus of claim 13, wherein the control unit is located at a remote location with respect to the imaging container.

15. The apparatus of claim 1, wherein the control unit comprises:
    one or more computers; and
    one or more computer memory devices interoperably coupled with the one or more computers and having tangible, non-transitory, machine-readable media storing one or more instructions.

16. The apparatus of claim 1, wherein the control unit further synchronizes the camera in the first image assembly to generate images during a time between the camera in the second image assembly generating consecutive pairs of images, and vice versa.

* * * * *